US006670736B2

United States Patent
Horng et al.

(10) Patent No.: US 6,670,736 B2
(45) Date of Patent: Dec. 30, 2003

(54) INSULATING JACKET STRUCTURE OF A STATOR OF A DIRECT CURRENT MOTOR

(75) Inventors: Alex Horng, Kaohsiung (TW); Ching-Sheng Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 10/076,641

(22) Filed: Feb. 19, 2002

(65) Prior Publication Data

US 2003/0155838 A1 Aug. 21, 2003

(51) Int. Cl.[7] .................................................. H02K 3/34
(52) U.S. Cl. ...................................... 310/194; 310/218
(58) Field of Search ................................ 310/194, 214, 310/218

(56) References Cited

FOREIGN PATENT DOCUMENTS

| JP | 8-149732 | * | 6/1996 | ............ H02K/3/46 |
| JP | 2001-54246 | * | 2/2001 | ............ H02K/3/34 |
| JP | 2002-44894 | * | 2/2002 | ............ H02K/3/34 |

* cited by examiner

Primary Examiner—Burton Mullins
(74) Attorney, Agent, or Firm—Bacon & Thomas, PLLC

(57) ABSTRACT

An insulating jacket structure of a stator of a direct current motor includes a body, and multiple extension plates extended outward from the body. Each of the extension plates has an inverted U-shaped receiving recess which has two sides having two distal ends each formed with a protruding locking snap. Multiple outer annular plates are extended outward from the two sides of the receiving recess, and a gap is formed between any two adjacent outer annular plates. Neck portions of the poles of the silicon steel plate assembly of the stator are received in the receiving recess, and the silicon steel plate located at the lowermost layer of the silicon steel plate assembly is snapped and locked by the locking snaps of the receiving recess.

7 Claims, 5 Drawing Sheets

INSULATING JACKET STRUCTURE OF A STATOR OF A DIRECT CURRENT MOTOR

BACKGROUND OF THE INVENTION

1. Field of the Invention

The present invention relates to an insulating jacket structure of a stator of a direct current motor, and more particularly to an insulating jacket structure of a stator of a direct current motor, wherein the insulating jacket may be wrapped on the outer periphery of the silicon steel plate assembly of the stator conveniently, and may be combined with the silicon steel plate assembly of the stator.

2. Description of the Related Art

A conventional stator structure of a radial winding direct current motor in accordance with the prior art shown in FIG. 7 comprises an upper insulating jacket 91, a lower insulating jacket 92, and a silicon steel plate 93. The upper insulating jacket 91 and the lower insulating jacket 92 are formed with mating positioning holes 94 respectively for passage of positioning members 95, such as pins. After the upper insulating jacket 91, the lower insulating jacket 92 and the silicon steel plate 93 are combined with each other, the poles of the silicon steel plate 93 may be wound with windings, thereby forming the conventional stator structure of a radial winding direct current motor.

However, fabrication of the conventional stator structure of a radial winding direct current motor is inconvenient, thereby increasing the cost of fabrication.

SUMMARY OF THE INVENTION

The primary objective of the present invention is to provide an insulating jacket structure of a stator of a direct current motor, wherein the insulating jacket may be assembled and combined with the silicon steel plate assembly of the stator conveniently, and the cost of fabrication may be reduced.

In accordance with the present invention, an insulating jacket structure of a stator of a direct current motor includes an insulating jacket body having a through hole, and multiple extension plates extended outward from the through hole of the insulating jacket body in a radiating manner. Each of the multiple extension plates has a receiving recess whose cross-section is substantially inverted U-shaped. The receiving recess of each of the multiple extension plates has two sides having two distal ends each formed with a protruding locking snap. Multiple outer annular plates are extended outward from the two sides of the receiving recess at the distal ends of each of the multiple extension plates, and a gap is formed between any two adjacent outer annular plates. Neck portions of the poles of the silicon steel plate assembly of the stator are received in the receiving recess of the insulating jacket, and the silicon steel plate located at the lowermost layer of the silicon steel plate assembly is snapped and locked by the locking snaps protruded from the two distal ends of the receiving recess.

Further benefits and advantages of the present invention will become apparent after a careful reading of the detailed description with appropriate reference to the accompanying drawings.

DETAILED DESCRIPTION OF THE PREFERRED EMBODIMENTS

Figure 1:
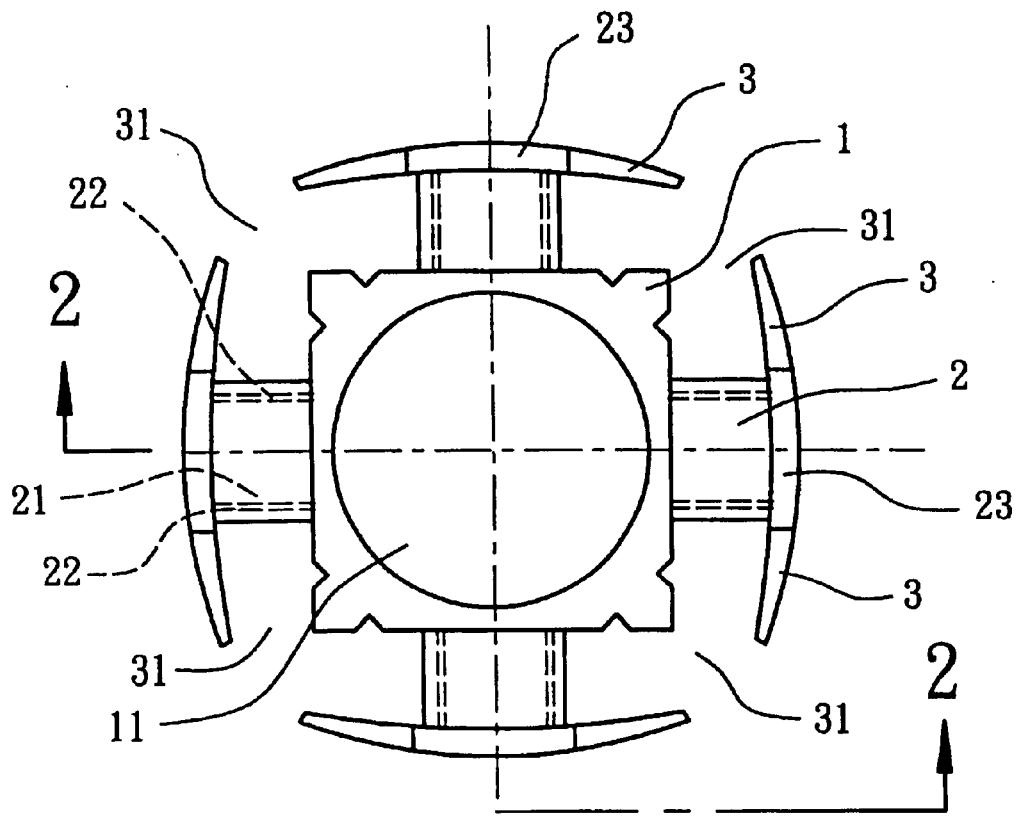
FIG. 1 is a top plan assembly view of an insulating jacket structure of a stator of a direct current motor in accordance with a first embodiment of the present invention.
Figure 2:
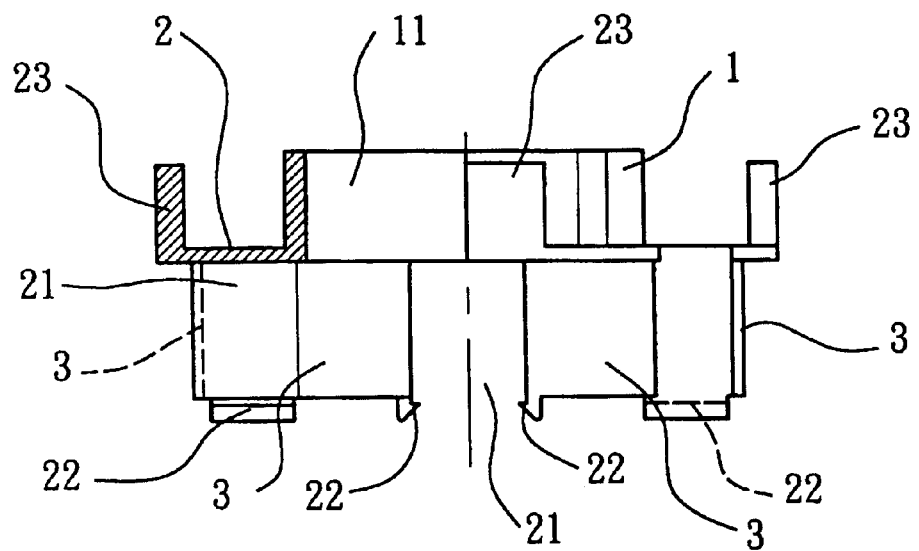
FIG. 2 is a cross-sectional view of the insulating jacket structure of a stator of a direct current motor taken along line 2—2 as shown in FIG. 1.
Figure 3:
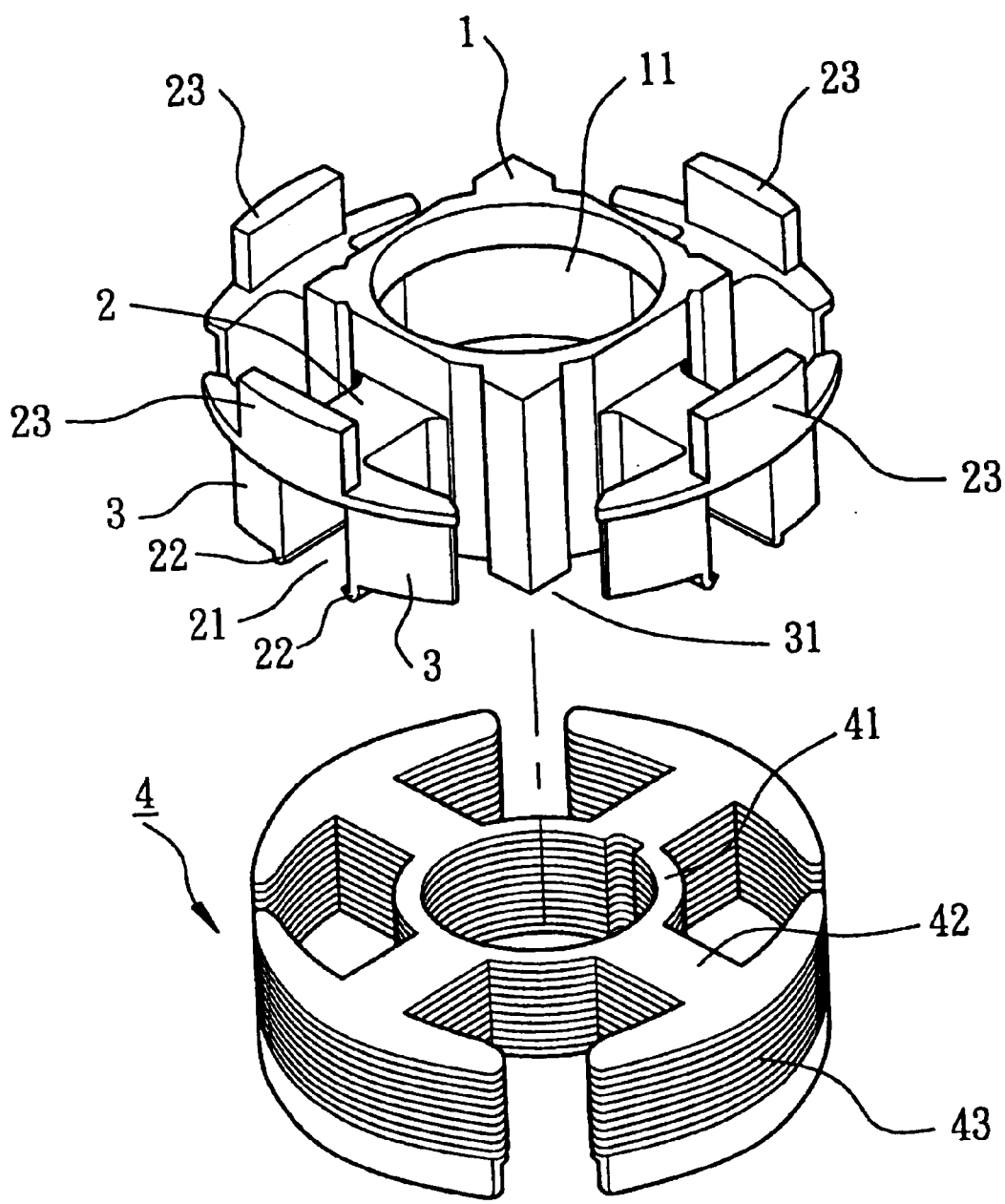
FIG. 3 is an exploded perspective view of an insulating jacket structure of a stator of a direct current motor in accordance with a first embodiment of the present invention.

Referring to the drawings and initially to FIGS. 1–3, an insulating jacket of a stator of a direct current motor in accordance with a first embodiment of the present invention is shown. The insulating jacket is made of insulating material, such as plastics or the like, and comprises a body 1, multiple extension plates 2, and multiple outer annular plates 3.

The body 1 has a proper height, and has a through hole 11 for passage of a shaft tube.

The multiple extension plates 2 are extended outward from the through hole 11 of the body 1 in a radiating manner. In the preferred embodiment of the present invention, the multiple extension plates 2 are distributed about the center of the through hole 11 of the body 1 in an equally angular manner. The cross-section of each of the multiple extension plates 2 is substantially inverted U-shaped, thereby forming a receiving recess 21. The receiving recess 21 of each of the multiple extension plates 2 has two sides having two distal ends each formed with a protruding locking snap 22. Each of the multiple extension plates 2 is provided with a protruding plate 23 opposite to the receiving recess 21, so that the coating wires may have a better positioning effect during the winding process after the insulating jacket is mounted on a silicon steel plate assembly 4.

The multiple outer annular plates 3 are connected at the distal ends of the multiple extension plates 2, and are extended outward from the two sides of the receiving recess 21. Two adjacent outer annular plates 3 are not connected, and a proper gap 31 is formed between any two adjacent outer annular plates 3.

Figure 4:
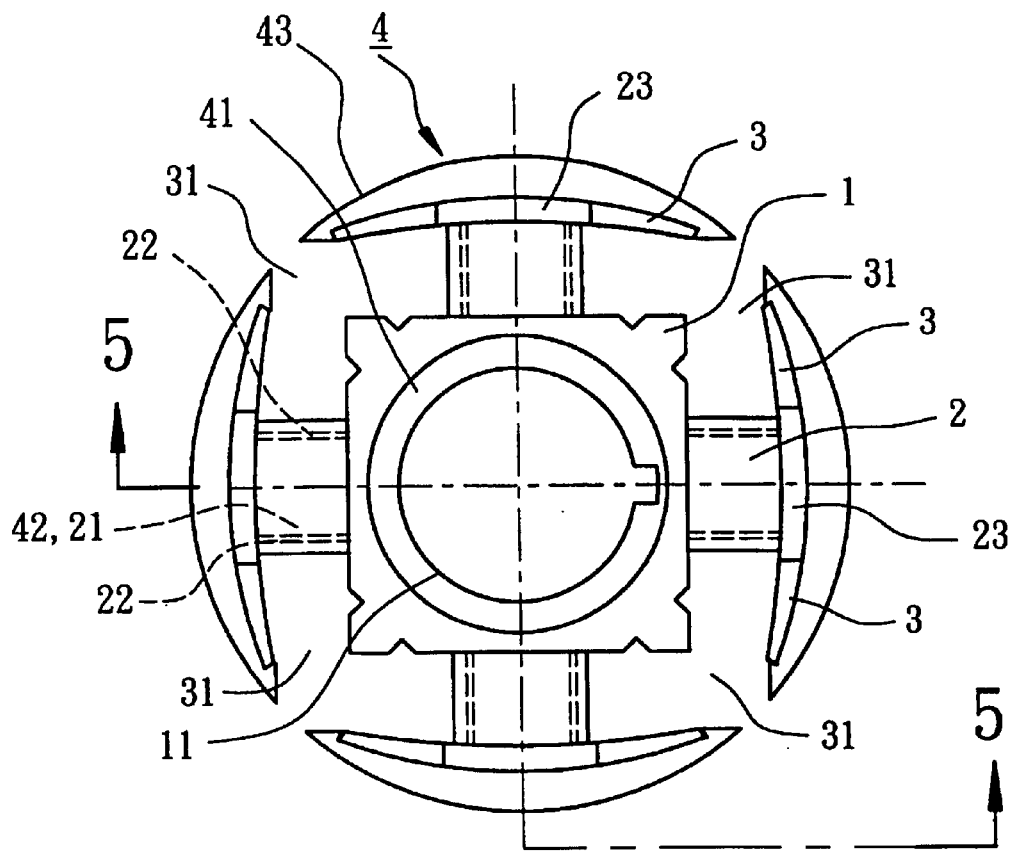
FIG. 4 is a top plan assembly view of an insulating jacket structure of a stator of a direct current motor in accordance with a first embodiment of the present invention, wherein the insulating jacket is combined with a silicon steel plate assembly.
Figure 5:
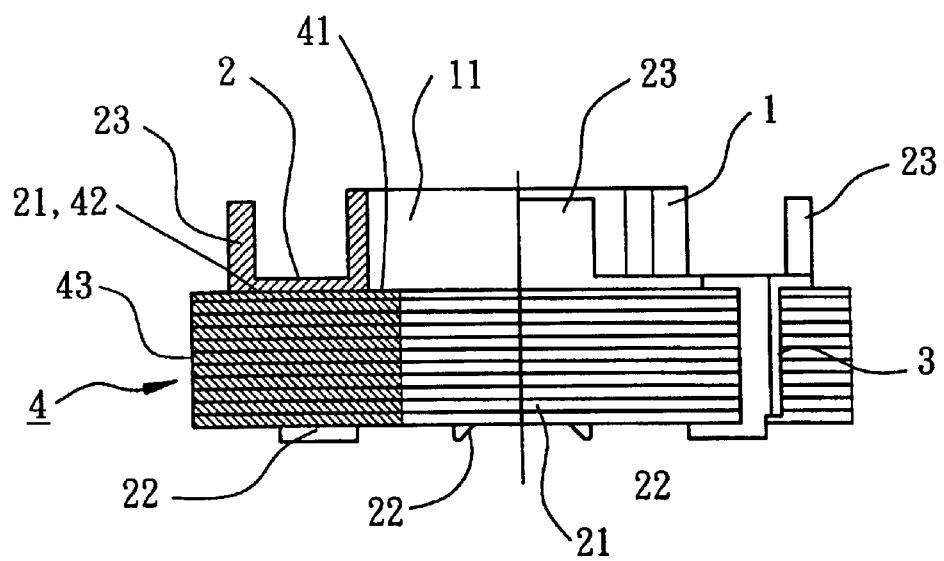
FIG. 5 is a cross-sectional view of the insulating jacket structure of a stator of a direct current motor taken along line 5—5 as shown in FIG. 4.

Referring to FIGS. 4 and 5, the body 1 is combined with the silicon steel plate assembly 4. The silicon steel plate assembly includes a hub 41, pole-faces 43, and neck portions 42 connecting the hub 41 and pole-faces 43. After lamination of the silicon steel plate assembly 4, the silicon steel plate assembly 4 is placed in the insulating jacket directly. The multiple extension plates 2 are mounted on the neck portions 42 of the silicon steel plate assembly 4 and the lowermost layer of the silicon steel plate assembly 4 are snapped and locked by the locking snaps 22. Thus, the silicon steel plate assembly 4 may be hidden in the insulating jacket. At this time, the hub 41 of the silicon steel plate assembly 4 is located in the through hole II of the body 1, each of the poles 42 is received in the receiving recess 21 of each of the multiple extension plates 2, and the pole face 43 is located outside of the multiple outer annular plates 3. Thus, when the coating wires are placed into the gaps 31 between the multiple outer annular plates 3 to perform the winding work, the coating wires may be wound around the peripheral surface of the multiple extension plates 2 between the body 1 and the multiple outer annular plates 3 of the insulating jacket. Each of the neck portions 42 of the poles of the silicon steel plate assembly 4 are snapped and locked by the locking snaps 22 at the two sides of the receiving recess 21 of each of the multiple extension plates 2, so that a distance is formed between each of the neck portions 42 of the silicon steel plate assembly 4 and the top of the locking snap 22 of the receiving recess 21 of each of the multiple extension plates 2. Thus, when the coating wires will be spaced from and will not contact the neck portions 42 of the poles. Further, when each of the multiple extension plates 2 is provided with the protruding plate 23, the wound coating wires may be collected and positioned on the peripheral surfaces of the multiple extension plates 2, and will not slip from the multiple extension plates 2.

Figure 6:
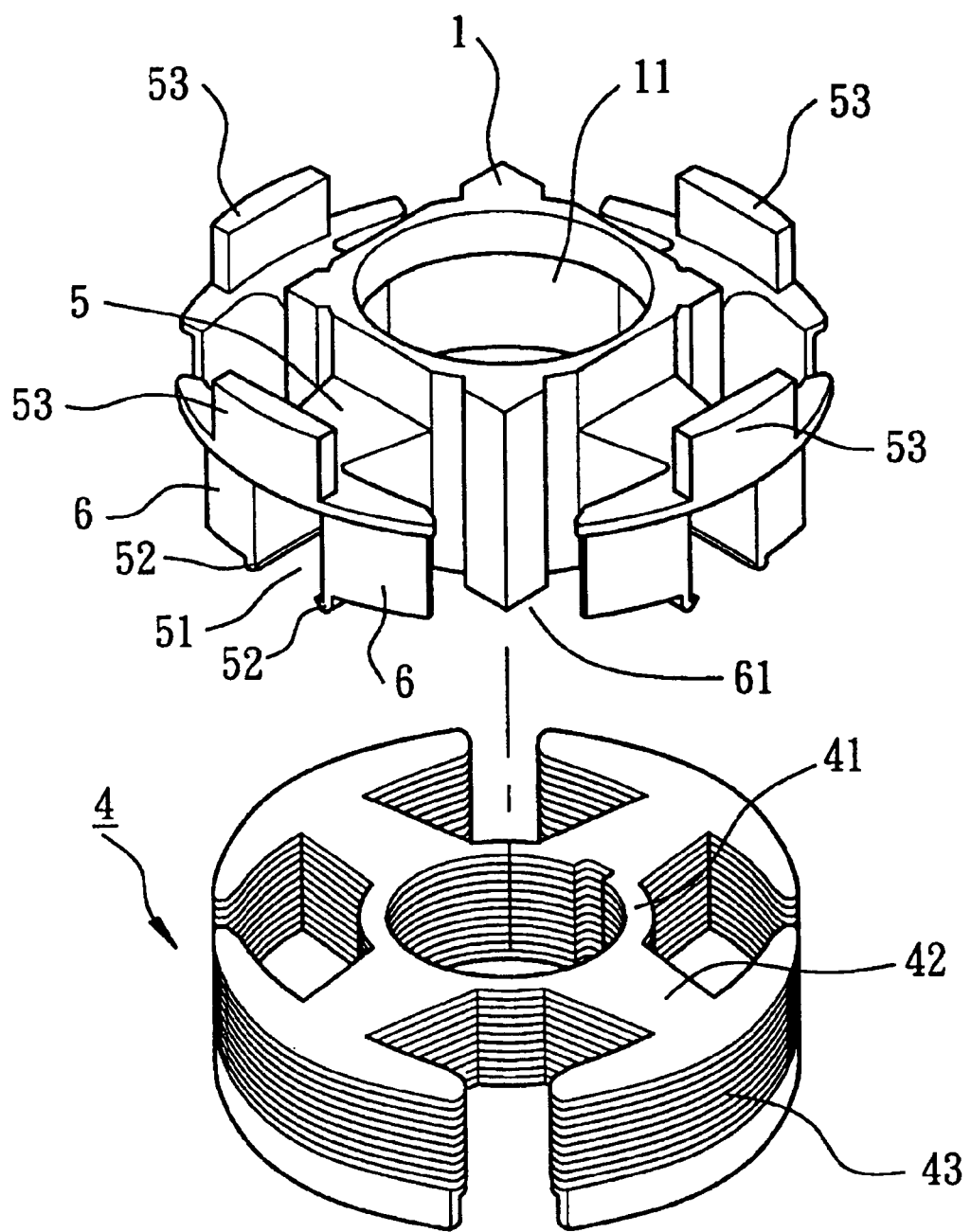
FIG. 6 is an exploded perspective view of an insulating jacket structure of a stator of a direct current motor in accordance with a second embodiment of the present invention.
Figure 7:
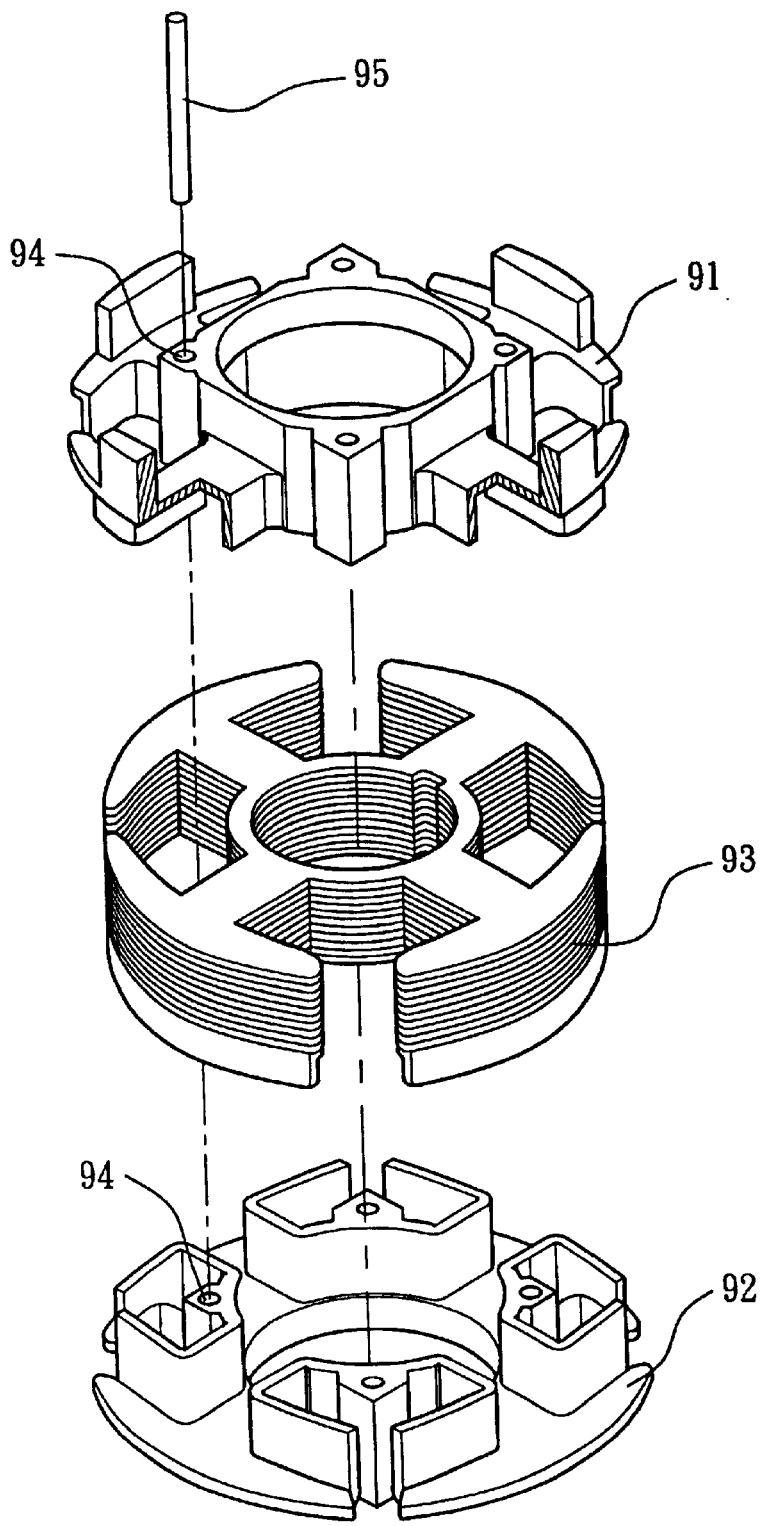
FIG. 7 is an exploded perspective view of a conventional stator structure of a radial winding direct current motor in accordance with the prior art.

Referring to FIG. 6, an insulating jacket of a stator of a direct current motor in accordance with a second embodiment of the present invention is shown. The insulating jacket comprises a body 1, multiple extension plates 5, and multiple outer annular plates 6.

The body 1 has a proper height, and has a through hole 11 for passage of a shaft tube.

The multiple extension plates 5 are extended outward from the through hole 11 of the body 1 in a radiating manner. Each of the multiple extension plates 5 has different widths, and has a first end connected to the body 1, and a second end opposite to the first end and having a width smaller than that of the first end. The cross-section of each of the multiple extension plates 5 is substantially inverted U-shaped, thereby forming a receiving recess 51. The receiving recess 51 of each of the multiple extension plates 5 has two sides having two distal ends each formed with a protruding locking snap 52. Each of the multiple extension plates 5 is provided with a protruding plate 53 opposite to the receiving recess 51, so that the coating wires may have a better positioning effect during the winding process after the insulating jacket is mounted on a silicon steel plate assembly 4.

The multiple outer annular plates 6 are connected at the distal ends of the multiple extension plates 5, and are extended outward from the two sides of the receiving recess 51. Two adjacent outer annular plates 6 are not connected, and a proper gap 61 is formed between any two adjacent outer annular plates 6. Thus, when the insulating jacket is combined on the silicon steel plate assembly 4 to perform the winding work, the coating wires may be wound around the peripheral surface of the multiple extension plates 5 between the body 1 and the multiple outer annular plates 6 of the insulating jacket, and the coating wires are collected toward a direction apart from the pole face 43 of the silicon steel plate assembly 4. Thus, the magnetic flux produced by the coils may be output from the pole face 43 directly, thereby reducing the magnetic resistance, and the motor may produce a greater rotation torque.

Accordingly, in the insulating jacket structure of a stator of a direct current motor in accordance with the present invention, the insulating jacket may be combined with the silicon steel plate assembly easily and conveniently, thereby reducing the working processes and steps, and thereby reducing the cost of fabrication. In addition, the pole between the extension plate and the silicon steel plate assembly has a first end whose width is greater than a second end of the pole. Thus, the wound coils may be collected toward the pole face of the silicon steel plate assembly, so that the magnetic flux produced by the coils may be output from the pole face directly of the silicon steel plate assembly, thereby reducing the magnetic resistance, and the motor may produce a greater rotation torque.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An insulating jacket structure of a stator of a direct current motor, the stator including a silicon steel plate assembly that forms a hub, pole-faces, and neck portions connecting the hub with the pole-faces, said jacket structure comprising;

a single body, having a through hole; and multiple extension plates, radially extended outward from the through hole of the body, each of the multiple extension plates having a receiving recess adapted to accommodate a respective said neck portion of the silicon steel plate assembly, the receiving recess of each of the multiple extension plates having two sides having two distal ends each formed with a protruding locking snap adapted to lock the respective said neck portion of the silicon steel assembly in the receiving recess and to insulate the neck portion from a wire wound around a corresponding one of said extension plates.

2. The insulating jacket structure of a stator of a direct current motor as claimed in claim 1, further comprising multiple outer annular plates extended outward from the two sides of the receiving recess at the distal ends of each of the multiple extension plates, and a gap being formed between any two adjacent outer annular plates.

3. The insulating jacket structure of a stator of a direct current motor as claimed in claim 1, wherein each of the multiple extension plates is provided with a protruding plate opposite to the receiving recess.

4. The insulating jacket structure of a stator of a direct current motor as claimed in claim 1, wherein each of the multiple extension plates has a first end connected to the body, and a second end opposite to the first end and having a width smaller than that of the first end.

5. An insulating jacket structure of a stator of a direct current motor, comprising:

a single insulating jacket body, having a through hole;

multiple extension plates, radially extended outward from the through hole of the insulating jacket body, each of the multiple extension plates having a receiving recess adapted to accommodate a respective silicon steel neck portion, the receiving recess of the each of the multiple extension plates having two sides having two distal ends each formed with a protruding locking snap adapted to lock the respective said neck portion in the receiving recess and to insulate the neck portions from a wire wound around a corresponding one of said extension plates;

multiple outer annular plates extended outward from the two sides of the receiving recess at the distal ends of each of the multiple extension plates, and a gap being formed between any two adjacent outer annular plates; and a silicon steel plate assembly, laminated by multiple silicon steel plates, and having a hub and multiple poles, said multiple poles each including a pole face and a respective said neck portion connecting the pole face to the hub, each of the neck portions of the silicon steel plate assembly received in the receiving recess of each of the multiple extension plates of the insulating jacket, wherein the silicon steel plate located at the lowermost layer of the silicon steel plate assembly is snapped and locked by the locking snaps protruded from the two distal ends of the receiving recess, the hub of the silicon steel plate assembly is located in the through hole of the insulating jacket body, and each of the pole faces is located outside of each of the multiple outer annular plates.

6. The insulating jacket structure of a stator of a direct current motor as claimed in claim 5, wherein each of the multiple extension plates of the insulating jacket has a first end connected to the body, and a second end opposite to the first end and having a width smaller than that of the first end of each of the multiple extension plates of the insulating jacket, and the pole of the silicon steel plate assembly has a first end connected to the hub, and a second end connected to the pole face and having a width smaller than that of the first end of the pole of the silicon steel plate assembly.

7. The insulating jacket structure of a stator of a direct current motor as claimed in claim 5, wherein each of the multiple extension plates is provided with a protruding plate opposite to the receiving recess.

* * * * *